March 29, 1966  D. B. MILLER  3,243,759
ELECTRICAL CONDUCTOR BUSHING ARRANGEMENT
Filed Jan. 30, 1964  2 Sheets-Sheet 1

INVENTOR.
DANIEL B. MILLER
BY
ATTORNEYS

March 29, 1966 D. B. MILLER 3,243,759
ELECTRICAL CONDUCTOR BUSHING ARRANGEMENT
Filed Jan. 30, 1964 2 Sheets-Sheet 2

INVENTOR.
DANIEL B. MILLER
BY
Robertson, Smythe & Bryan
ATTORNEYS

United States Patent Office 3,243,759
Patented Mar. 29, 1966

3,243,759
ELECTRICAL CONDUCTOR BUSHING ARRANGEMENT
Daniel B. Miller, Pawtucket, R.I., assignor to International Telephone and Telegraph Corporation, Nutley, N.J., a corporation of Maryland
Filed Jan. 30, 1964, Ser. No. 341,278
5 Claims. (Cl. 339—128)

This invention relates to a bushing arrangement for insertion in an opening of a panel of electrical apparatus. More particularly, the invention relates to such a bushing arrangement which may serve as an electrical conductor strain relief device and if desired, as a safety connector for electric appliances such as radio and television receivers, which present hazardous voltages when connected to a power source.

The exposed current-carrying parts of such devices are normally located in an enclosure or cabinet. The cord connector is attached to the back panel or other removable cover of the cabinet so that when the panel or cover is removed, the cord connector and therefore the power supply are automatically disconnected from the chassis of the radio or television receiver.

There are specifications promulgated by such agencies as Underwriters Laboratories, Inc., Canadian Standards Association, and the trade practice in general, which require that the cord connector, after it is assembled to the removable panel or cover by the manufacturer, shall not be removable therefrom without the use of tools.

A principal object of the present invention is to provide a two-piece interlocking assembly, including an electrical cord connector, by which the later can be quickly and easily assembled to the panel in an opening therethrough so as to meet this basic requirement. This two-piece assembly, which may be referred to as an interlock connector, also provides other features desirable for reasons of safety and manufacturing economy.

According to my invention, the electric cord connector has a specially constructed plug dimensioned for advancement into the interior of an electric apparatus through a panel opening thereof along with part of the trailing cord. When the plug has been so advanced, a flexible bushing surrounding the trailing cord and forming the other piece of the assembly is collapsed at one end and advanced into the panel opening, whereupon the collapsed end is allowed to expand so that flange means on that end together with flange means on the opposite end of the bushing serve to secure the latter against withdrawal in either direction from the panel opening. The plug's trailing end portion, which is enlarged but tapered toward the bushing, is then inserted in the passage of the bushing at its advanced end and the plug is retracted into this passage, thereby contracting the enlarged trailing end portion of the plug until it emerges from the opposite end of the bushing, whereupon it expands. This expanded enlarged end portion of the plug, and its opposite end portion which is flanged, then serve to prevent withdrawal of the plug in either direction from the bushing so that these two pieces are positively interlocked in the panel opening.

Thus, the plug prevents collapse of the collapsible end of the bushing, and neither the plug nor the bushing can be withdrawn from the panel opening without first contracting the enlarged tapered end portion of the plug and/or enlarging the adjacent end of the passage through the flexible bushing, by means of a tool. Also, when the bushing and plug are thus interlocked, the bushing provides additional protective electrical insulation around that portion of the plug through which a current-carrying part may otherwise be exposed due to the plug being molded around the electrical contact elements and the bare wires connected to those elements.

Further, the invention provides an arrangement for shipping and handling them prior to their use in which the bushing is removably attached to the electrical conductors at a slightly spaced position from the plug, thus to assure that all parts would be readily available for assembly when desired.

Additionally, the invention contemplates that the plug will contain a pair of electrical connectors which are positioned to connect with a mating pair in the electrical apparatus.

For a better understanding of the invention, reference may be had to the accompanying drawings in which.

Figure 3:
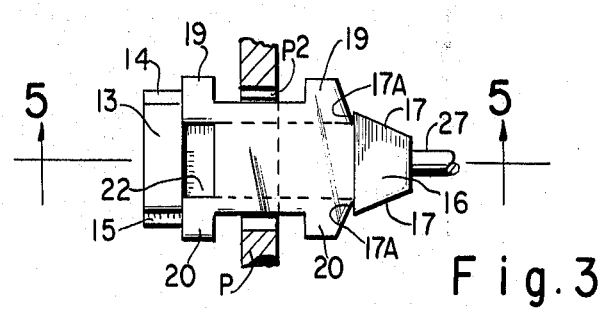
FIG. 3 is a view similar to FIG. 1 but showing the bushing advanced into the panel opening and the plug retracted into the bushing to interlock therewith.
Figure 4:
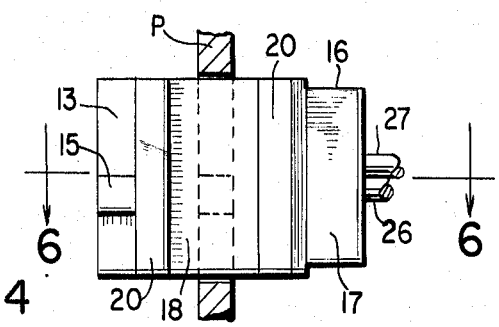
FIG. 4 is a plan view of the parts as illustrated in FIG. 3.
Figure 5:
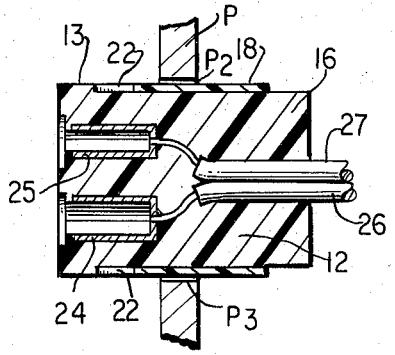
Figure 8:
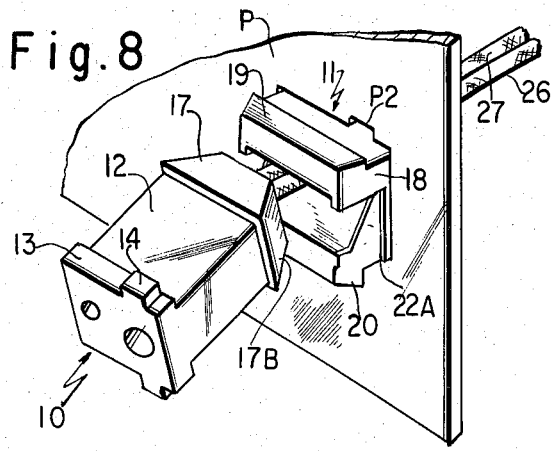
Figure 6:
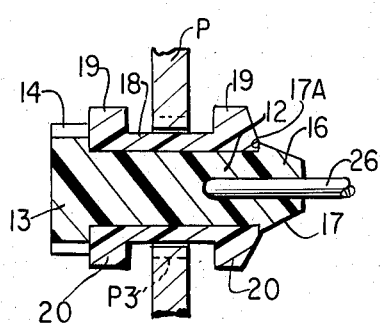
Figure 9:
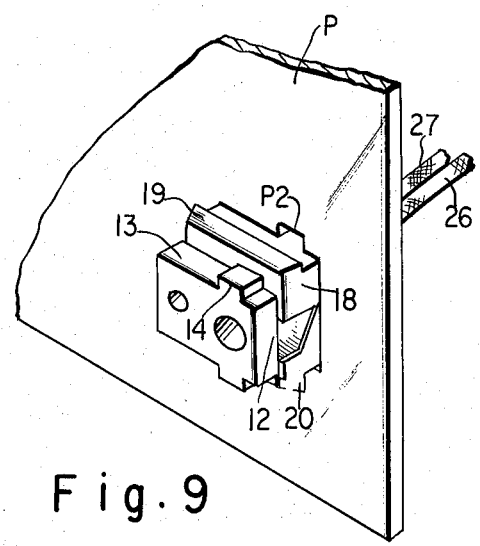
Figure 7:
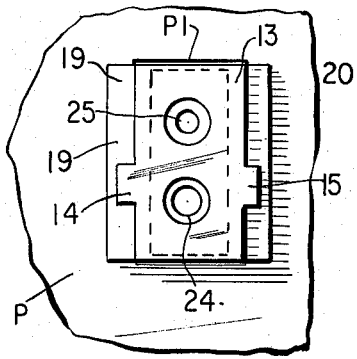

FIGS. 5 and 6 are sectional views on the lines 5—5 and 6—6 in FIGS. 3 and 4, respectively;

FIG. 7 is an end view of the interlocked parts in the panel opening, showing the end portion of the plug in which the electrical contact elements are secured;

FIG. 8 is a perspective view of slightly modified forms of the plug and bushing, showing these parts after advancement of the plug through the panel opening and after advancement of the bushing into the panel opening but before retraction of the plug into the bushing; and FIG. 9 is a view similar to FIG. 8 but showing the parts after retraction of the plug into the bushing to interlock therewith.

Referring to the drawings, the invention is exemplified by an interlock connector as illustrated in FIGS. 1 through 7, comprising a cord connector plug 10 and a flexible bushing 11 adapted to be assembled in interlocking relation to a panel P in an opening P1 extending through the panel. The panel P may be the usual removable back panel of the cabinet of the radio or television receiver (not shown). The panel opening P1 is shown as rectangular with the opposed longer edges extending horizontally, although these longer edges could, of course, extend vertically or otherwise. Two of the opposite parallel edges of the panel opening P1 are provided with opposed notches P2 and P3, respectively, which are off-centered in these edges for a purpose to be described presently. The notches P2–P3, as illustrated, are located in the longer edges of the rectangular opening P1 in the panel.

Figure 1:
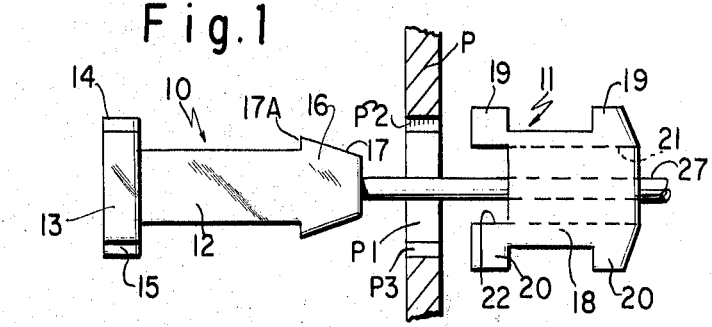
FIG. 1 is a side elevational view of the plug and bushing after advancement of the plug through the panel opening, the panel being shown in section.
Figure 2:
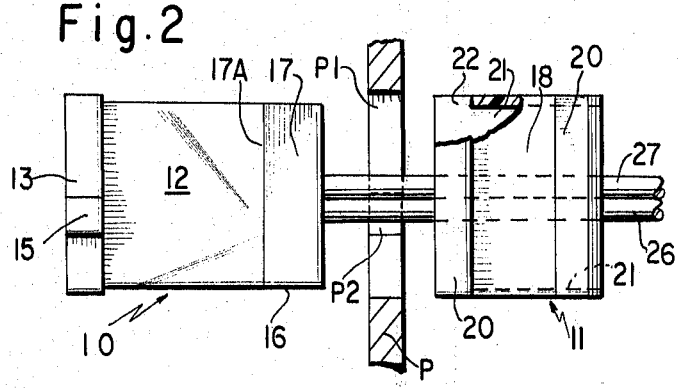
FIG. 2 is a plan view of the parts as illustrated in FIG. 1, the panel being shown in a different section.

The connector plug 10 has a body 12 which is shown as rectangular in cross section, but may be oval, round or otherwise. Integral with the body 12 is a flanged end portion 13 of rectangular shape dimensioned to fit through the panel opening P1. At opposite sides, the plug end portion 13 has projections or detents 14 and 15, respectively, integral with the respective flanges and positioned to pass through the notches P2 and P3, respectively, when the flanged end portion 13 is fitted through the panel opening P1 in a certain position relative to the panel. At its opposite end, the plug body 12 has an integral enlarged end portion 16 which is resilient and contractable, and which is dimensioned to fit freely through the panel opening P1. The enlarged end portion 16 has opposite surfaces 17 tapering away from the main body 12 and forming shoulders 17A extending along the relatively wide sides of body 12. The other two opposite surfaces of the enlarged end portion 16 are flush with the corresponding upper and lower surfaces of the plug body 12 (FIGS. 1 and 2). Thus, the enlarged end portion 16 tapers away from the opposite flanged end portion 13 of the plug, and its shoulders 17A are contractable due to the resilient nature of the material forming the plug.

The bushing 11 includes a hollow body 18 shown as having a rectangular cross section, but which may be shaped otherwise to conform to the shape of the plug 10. It is provided with opposite end flanges 19 at one side and with opposite end flanges 20 at the other side. The end flanges 19 and 20 project outwardly and laterally from the bushing body 18 and form flange means for securing the bushing against withdrawal in either direction from the panel opening P1 after the bushing has been inserted in this opening. The hollow interior of the bushing has formed therein a through-passage 21 opening through the opposite ends of the bushing, this passage being rectangular in cross section and dimensioned to closely receive the reduced body portion 12 of the plug. As shown in FIGS. 1 and 2, the flanges 19 and 20 extend along the relatively wide top and bottom of the bushing, while the side surfaces of the bushing (which are relatively narrow) are not flanged and thus form straight surfaces extending from one end of the bushing to the other. Due to the flanges 19 and 20, the lateral dimensions of the ends of bushing 11 are substantially greater than that of the panel opening P1, although the intermediate body portion 18 of the bushing is adapted to be received in this opening with a close fit. At its end facing the plug 10, as shown in FIGS. 1 and 2, the bushing 11 is provided with a horizontally arranged notch 22 to facilitate collapsing this end of the bushing when it is to be inserted in the panel opening. This notch is in each side of the bushing from top to bottom and its shape may be varied.

The plug 12 contains electrical contact elements 24 and 25 which are shown as female receptacles for the usual prongs (not shown) secured to the chassis of the receiver. On the version shown, the receptacle contact 24 is somewhat larger in diameter than the other receptacle contact 25 to provide for polarization of the electrical connection to the chassis, as will be readily understood by those skilled in the art. This polarization is not required in many instances. Two insulated electrical conductors 26 and 27 form the electrical cord and extend into the plug 10 through its enlarged end portion 16, the bare wires of these conductors being electrically connected to the respective receptacle contacts 24 and 25 at the flanged end portion 13 of the plug.

The connector plug 10 and bushing 11 are made of a suitable electrical insulating material of a plastic type which may be molded. The plastic material forming the plug 10 is molded around the electrical contacts 24, 25, and the adjacent ends of the respective conductors 26, 27, as indicated in FIG. 5. This molding, and that of the bushing 11 being preferably performed in a single operation with a mold having two similar pieces (not shown), each forming one-half of the plug on the section shown in FIG. 6. In this molding process, it is possible for the end of some of the strands of the wire conductors, at the region where they are connected to the contacts 24, 25, to protrude through the molded body and thus present an electrical hazard. If this should occur, however, the protruding strands are covered by the insulating bushing 11 after assembly of the parts, as will be described.

As the bushing part 11 is molded around the conductors 26, 27 at a position rearwardly of the plug 10 and the conductors during molding are maintained tangent to the interior of the passage 21, some of the plastic material injected into the mold will normally contact the insulation of the electrical cord 26, 27 located in the bushing passage 21. This forms a bond between the cord and the bushing 11 which keeps the bushing in place behind the connector plug 10 until the parts are to be assembled to the panel P, at which time the bushing is easily peeled from the cord. Thus, the arrangement allows the cord sets to be shipped and handled with the parts being held together ready for assembly.

To assemble the interlock connector to the panel P, the plug 12 is first inserted completely through the panel opening P1 along with part of the trailing cord 26, 27, as shown in FIGS. 1 and 2. Because of the placement of the projections 14, 15 and the corresponding notches P2, P3 in the panel opening, the plug can be inserted through this opening in only one position relative to the panel, thereby facilitating proper assembly to provide the desired polarization by predetermined locations of the larger and smaller contact elements 24, 25 relative to the panel and the mating electrical prongs (not shown). In other words, the panel opening P1 has an irregular shape and the flanged end portion 13 of the plug is irregularly shaped to pass through the panel opening in only one rotational position relative to the panel. This arrangement may be, mainly, when polarization is required.

The notched end of bushing 11 is then collapsed, as by finger pressure against the corresponding flanges 19, 20, and this end of the bushing is pushed through the panel opening P1. When the collapsing pressure is released, this notched end of the bushing expands back to its normal condition with the reduced body portion 18 fitting quite closely in the panel opening and with the flange means 19, 20 opposing adjacent faces of the panel so as to prevent withdrawal of the bushing from the opening P1. The cord 26, 27 is now peeled away from its bond to the bushing 11, and the connector plug 10 is drawn back through the bushing passage 21 by pulling on the exposed trailing portion of cord 26, 27. It will be understood that the reduced end of the tapered end portion 16 of the plug is adapted to fit readily into the adjacent end of the bushing passage 21; and as the plug is forced into the bushing passage, the shoulders 17A are compressed or contracted by the camming action of the tapered surfaces 17. Also, the flexibility of the bushing facilitates insertion of the enlarged tapered portion 16 of the plug into the bushing passage and movement of this portion through the passage.

The plug 10 is thus forced into the bushing passage 21 until the flanged end portion 13 of the plug seats against the opposing collapsible end of the bushing where the latter is provided with notch 22. When this point is reached, the opposite tapered end portion 16 of the plug has emerged entirely from the bushing 11 and has, therefore, expanded back to its normal shape, so that the parts are interlocked as shown in FIGS. 3, 7. With the assembly thus completed, the plug shoulders 17A oppose the adjacent end of the bushing and, in conjunction with the flanged portion 13 at the opposite end of the plug, secure the latter against withdrawal in either direction from the bushing. Also, the flange means 19, 20 at opposite ends of the bushing, being opposed to the respective adjacent faces of the panel, serve to secure the bushing against withdrawal in either direction from the panel opening P1. Rotational movement of the plug 10 relative to the panel is prevented because the reduced intermediate portion of the plug fits closely in the passage 21 of rectangular cross section in the bushing 11, and the reduced intermediate portion of the bushing fits closely in the rectangular opening P1 of the panel.

It will also be observed that due to the presence of the plug in the bushing passage 21, the collapsible end of the bushing cannot be collapsed, and therefore the assembly cannot be removed from the panel until the plug 10 is removed from the bushing. The latter removal cannot be effected without the use of a tool for compressing the shoulders 17A together sufficiently to enable the tapered end portion 16 to re-enter the bushing passage 21. Accordingly, the interlock connector meets the previously mentioned requirement in this respect. It also meets the further requirements pertaining to the minimum force at which the plug connector can be pulled out of the panel by tension exerted on the cord 26, 27.

The interlock connector as illustrated includes no metal parts as are often used, other than the current-carrying contacts 24, 25 connected to the respective wires of the cord. This prevents the possibility of accidentally completing a circuit between one of the current-carrying parts through some other metal part to a metallic panel or the chassis of the receiver, and also affords manufacturing economies, since the connector 10 and the bushing 11 may be normally reproduced simultaneously in the same mold.

It will be apparent that the size of the panel opening P1 and the length of the reduced intermediate portion 18 of the bushing (the portion lying between the end flange means 19, 20) may be varied to provide any desired amount of movement of the interlock connector relative to the panel after assembly. Such relative movement is desirable in order to provide for any misalignment of the panel opening and the pronged electrical connector on the chassis (not shown) which may occur during the course of manufacture.

The embodiment of the invention shown in FIGS. 8 and 9 is similar to that previously described except that the enlarged end portion of the plug 10 has a second pair of opposed tapered surfaces 17B extending between the tapered surfaces 17; and the collapsible end of bushing 11 has an undercut notch 22A in the ends of the side walls thereof which further facilitates collapsing of this end incident to inserting the bushing into the panel opening.

It should be recognized by those in the art that the construction described may be used as a strain-relief bushing for an electrical lead to an electrical apparatus by simply molding the plug 10 around the electrical conductor at a desired point along its length.

Although the various features of the invention have been shown as applied to several embodiments of the invention, it will be evident that changes may be made in such details and certain features may be used without others without departing from the principles of the invention.

What is claimed is:

1. An electrical conductor bushing arrangement for insertion in the opening of an electrical apparatus panel comprising a flexible bushing of electrical insulating material and having a minimum transverse profile to closely fit in said opening, the bushing having ends projecting from the faces of said panel and also having a passage extending through said ends, integral raised flange means on each end of said bushing and having a spacing therebetween to accept the thickness of said panel and coact when so placed with the other flange means to secure the bushing against withdrawal in either direction from said opening, the flexible bushing having a pair of oppositely disposed protruding flanges at one end and being elastically collapsible thereat to permit passing of the raised flange means through said panel opening for insertion of the bushing in said opening, a plug of electrical insulating material receivable in said bushing passage with a close fit to prevent the collapsing of said bushing, the ends of the plug projecting from each end of the bushing, the plug having a flange on one end portion smaller than the panel opening, said flanged end portion disposed adjacent the exterior of said collapsible end of the bushing to prevent movement of said plug in one direction through the bushing, the plug also having on its other end a resilient enlarged end portion with slightly greater dimensions than that of said bushing passage such that said plug enlarged ends secure the plug against movement in the opposite direction through the bushing when in operative position, a pair of electrical conductors secured in said plug, said enlarged end portion having a tapered portion to ease the insertion of said plug through said bushing passage from the direction of said collapsible end, whereby both said enlarged end portion and flexible bushing are elastically deformed by the movement of the plug through the passage from said collapsible end and return to their normal form upon emergence of said enlarged end from said passage.

2. The arrangement as defined in claim 1, in which said electrical insulating material is a molded plastic.

3. The arrangement as defined in claim 1, in which said plug contains therein a receptacle contact on the end of each of said electrical conductors.

4. The arrangement as defined in claim 3, in which said receptacle contacts are of different sizes to provide for electrical polarization, and said flanged end portion of the plug is irregularly shaped to pass through a similarly shaped panel opening in only one rotational position relative to said panel, thereby to facilitate predetermined positioning of the receptacle contacts relative to the panel.

5. The arrangement as defined in claim 1, in which said collapsible end of the bushing has a notch in the ends of the side walls thereof to facilitate said collapsing.

References Cited by the Examiner

UNITED STATES PATENTS

| 3,016,562 | 1/1962  | Reid          | 16—2     |
| 3,052,865 | 9/1962  | Pappano et al.| 339—126  |
| 3,056,852 | 10/1962 | Sachs         | 174—153  |
| 3,082,642 | 3/1963  | Hammerand     | 174—153 X|

ROBERT K. SCHAEFER, *Primary Examiner.*

LARAMIE E. ASKIN, *Examiner.*